United States Patent

[11] 3,613,601

| [72] | Inventor | Jean Pomagalski<br>114 Avenue de l'Eygale, 38 La Tranche', France |
|---|---|---|
| [21] | Appl. No. | 779,438 |
| [22] | Filed | Nov. 27, 1968 |
| [45] | Patented | Oct. 19, 1971 |
| [32] | Priority | Dec. 29, 1967 |
| [33] | | France |
| [31] | | 5208 |

[54] SUPPORT DEVICE FOR AERIAL CABLE
4 Claims, 4 Drawing Figs.

[52] U.S. Cl. ................................................. 104/197,
104/115, 104/173, 104/191
[51] Int. Cl. .................................................. B61b 7/10
[50] Field of Search .......................................... 104/191,
197, 173, 202, 89, 91, 93, 112, 113, 114, 115, 116;
254/190; 74/230.7

[56] References Cited
UNITED STATES PATENTS
2,821,937  2/1958  Madsen ........................ 104/115

| 3,048,048 | 8/1962 | Weston ........................ | 74/230.7 |
| 364,500 | 6/1887 | Dougherty ........................ | 104/191 |
| 3,391,650 | 7/1968 | Goforth et al. ........................ | 104/173 |

*Primary Examiner*—Arthur L. La Point
*Assistant Examiner*—Robert Saifer
*Attorneys*—Robert E. Burns and Emmanuel J. Lobato

ABSTRACT: This disclosure concerns a device for supporting and guiding an aerial cable to which is imparted a longitudinal movement for the conveying of loads made fast on the cable, and including a chassis on which are pivoted to support the cable at least two rotatable rollers having substantially parallel rotational axes, the chassis being connected to a fixed element such as a tower. The device has two members positioned respectively at the entrance and the exit of the supporting device and preventing the cable from disengaging from the rolling surface of the rollers. The movable cable bears laterally against the members due to the spatial arrangement of the hooking point of the chassis to the fixed element relative to the active surfaces of these limiting members.

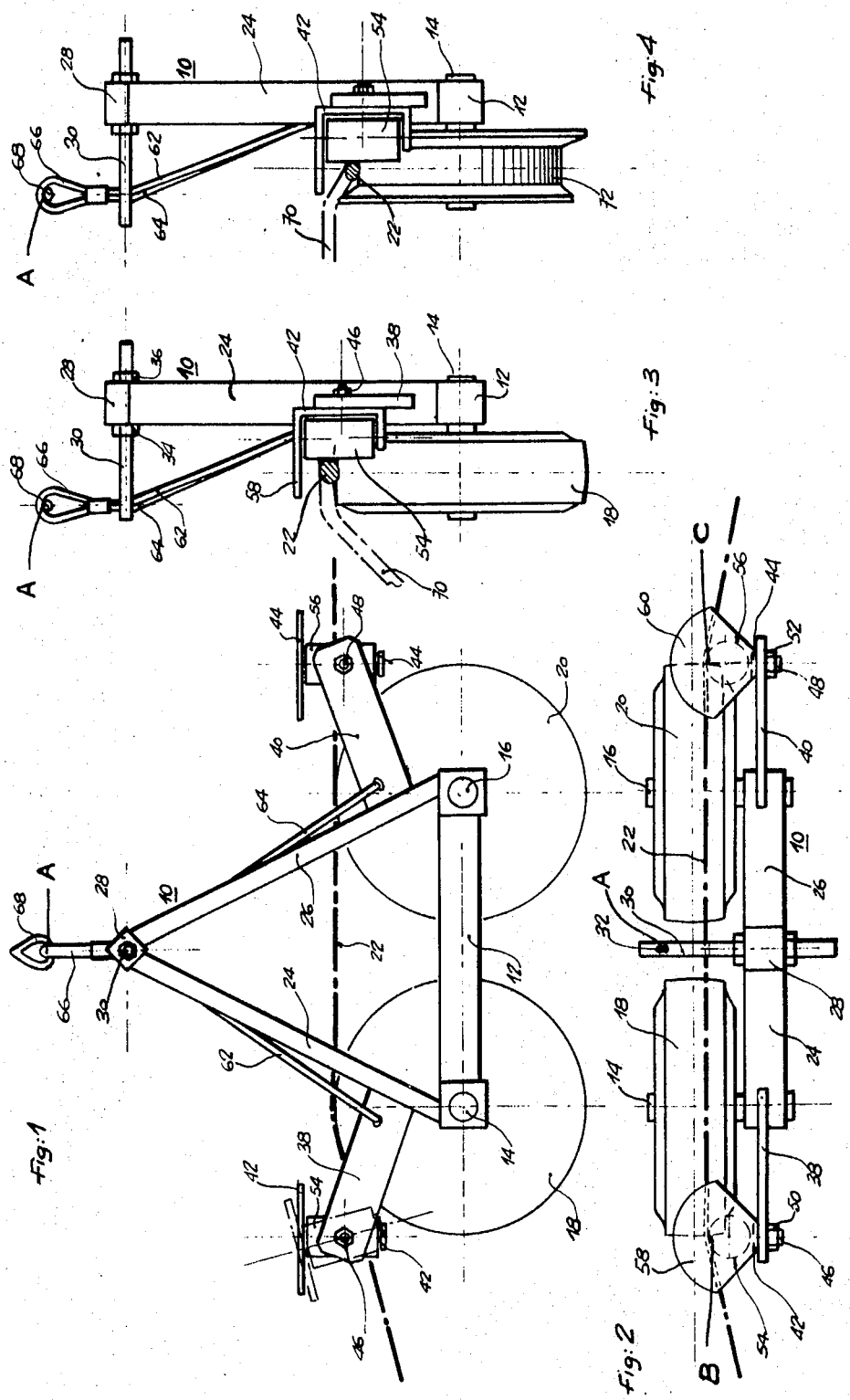

SUPPORT DEVICE FOR AERIAL CABLE

This invention relates to transport or towing installations with an aerial cable in which a certain number of loads are attached to a cable to be driven along the path of the cable to which is imparted a longitudinal movement. By way of example may be mentioned ski lifts or ski tows, log conveyors, etc. To support and guide the cable, there are used in these installations devices comprising rotating grooved rollers, the cable passing in the grooves to give it a given trajectory and to hold it at a desired distance from the ground.

In known devices, the hooking point of the support is located approximately in the plane of symmetry of the rollers and there results an instability in the position of the cable in the grooves. In effect, particularly in the case where the cable only makes a very open angle at the place of the support and only exerts a small supporting force on this support, the cable can move laterally in the grooves, as for example in the case of a shock. Owing to the poor position in known devices of the hooking point of the support, this support has a tendency, when the cable begins to move laterally, to turn in the wrong direction which causes derailing of the cable. To avoid this danger it is necessary to provide very deep grooves of a suitable form which lead to giving to the fasteners sinuous shapes which complicate their passage on the rollers.

Moreover, the applicant has already proposed to guide an aerial cable by rollers having a pneumatic band U.S. application Ser. No. 751,505 filed Aug. 9, 1968 the cable seeking a rolling path on the tire into which it digs slightly, and if special measures are not taken there is a danger that the cable will become disengaged from the tire.

The purpose of the invention is to create a supporting device with grooved or tire rollers in which there is given to the cable a stable position on the center of the rolling surface of the rollers, the forces urging the cable towards this position being derived from the stresses exerted by the cable and by its loads on the support, which guarantees a perfect self-adjustment without the necessity of providing very deep grooves or very closed opening angles for the cable.

The support and guiding device for an aerial cable given a longitudinal movement for the carrying of loads fast thereon according to the invention comprises a chassis on which are pivoted for supporting said cable at least two rotating rollers with substantially parallel rotational axes, the said chassis being hooked to a fixed element such as a tower, and is characterized by the fact that it comprises disengaged members, positioned respectively at the entrance and the exit of the supporting device for preventing the cable from becoming disengaged from the rolling surface of the rollers. The movable cable continuously bears laterally against the members due to the spatial disposition of the fastening point of said chassis to said fixed element relative to the cable contact surfaces of said limiting members.

In a preferred embodiment each limiting member is constituted by a rotating roller.

Other characteristics and advantages of the which: will appear from the description which will follow of two embodiments of the invention given by way of nonlimiting examples. These examples are shown in the accompanying drawing in which:

FIG. 1 shows a view in elevation of a supporting device according to the invention;

FIG. 2 shows a top view of the device of FIG. 1;

FIG. 3 is an end view of the device of FIG. 1; and

FIG. 4 is an end view of a modification of the device of FIG. 1.

In FIGS. 1 to 3, a triangular chassis 10 comprises a base beam 12 supporting at its extremities parallel shafts 14 and 16 on which are mounted two coplanar rotating rollers, 18 and 20 respectively, equipped with pneumatic bands, the rolling band of which supports and guides an aerial cable 22, to which a longitudinal movement is imparted. The branches 24 and 26 of the triangle meet at a peak 28 where they are made fast in suitable fashion and have a hole or bore perpendicular to the cable 22, and to the plane of rollers 18 and 20, and to the plane of triangular chassis 10. This hole if freely traversed by a threaded rod 30 having near one of its extremities a vertical opening 32. Rod 30 can be immobilized in a desired longitudinal position by nuts 34 and 36 which tighten branches 24 and 26 at their common peak 28. Two legs 38 and 40 are welded on branches 24 and 26, respectively, and receive at their free end collars 42 and 44, respectively, secured by means of pins 46 and 48 passing through legs 38 and 40 and nuts 50 and 52 in such a way that their angular position is adjustable. Rollers 54 and 56 are rotationally mounted inside collars 42 and 44, the axes of rotation of rollers 54 and 56 being preferably located in a plane perpendicular to the common plane of the rotational axes of rollers 18 and 20. The upper flanges 58 and 60 of the collars are extending outwardly over cable 22 and constitute stops to prevent the cable from leaving the rollers due to a jumping movement. The free edges of flanges 58 and 60 are arcuate, (see FIG. 2) to allow passage of the fasteners in the case where the cable gives a general upward disposition to the support. Two fastening cables 62 and 64 (not shown on FIG. 2) are located on legs 38 and 40 and pass through hole 32 to be reunited in a hook 66 connected to a fixed eye 68 forming part of a tower (not shown).

Naturally, a certain number of devices according to FIGS. 1 to 3 are staggered along cable 22, each device assuming a position dependent upon the path of the cable.

It will be noted that the members for limiting the lateral movement of the cable can be constituted in the case of a small support of the cable not by rollers but by simple guiding shoes.

It is understood that the cable 22 which are secured loads (not shown) by means of fasteners schematically indicated by 70 in FIGS. 3 and 4, exerts a stress on the support device, the resultant vector of which passes through the hooking point A of hooks 66 and 68. The position of cable 22 is determined by rollers 54 and 56 against which the cable bears and the axes of which are perpendicular to cable 22 at the contact places to minimize wear by friction, which is possible owing to the possibility of angular adjustment of collars 42, 44 around pins 46, 48 (the left hand side of FIG. 1 shows two positions that collar 42 can occupy with its roller 54). To urge cable 22 into permanent contact with rollers 54, 56, hole 32 the passage of securing cables 62 and 64 is sufficiently staggered to the left (relative to FIG. 3) so that the horizontal component (relative to FIG. 2) of said resultant is firmly large to urge the cable sufficiently against rollers 54 and 56. The more the hole 32 (thus Point A) and rod 30 are staggered to the left, the greater the said component exerted on the rollers by cable 22, so that rollers 54 and 56 maintain the cable invariably in the plane of symmetry of the rolling surfaces of the tires of rollers 18 and 20.

There can be seen of FIG. 2 that the fastening point A and the contact points B and C of cable 22 with rollers 54 and 56, seen in orthogonal projection on the plane of FIG. 2 (or on the plane of the axes rotation of rollers 18 and 20) form an isosceles triangle ABC cut by cable 22, also seen in projection on this plane. Essentially, according to the invention, the peak A of the triangle is located on the same side of base BC as cable 22, the height of the triangle being preferably a multiple of the diameter of the cable.

FIG. 4 shows the invention in its application to a train of conventional grooved rollers 72. The arrangement of the pieces and the operation are identical to those described above. It is to be understood that an installation can be equipped with both train of tire rollers and trains of grooved rollers, the first being provided in the places where the resultant of the load on the support approximates the vertical, the latter in the places where the resultant of the load approximates the horizontal in order to facilitate the passage of the fasteners. In any case the rollers adjust themselves in such a way that the general plane of the rollers forms a small angle with the resultant of the forces exerted by the cable against the support, that is to say, with the perpendicular connecting the fastening point to the axis of the cable.

What is claimed is:

1. A supporting and guiding device for a longitudinally movable aerial cable comprising a chassis having a fastening point and having at least two rollers for supporting a cable, said rollers being rotatably mounted on said chassis and having substantially parallel rotational axes, means connected to said fastening point for suspending said chassis from a fixed element, two members for limiting lateral movement of said cable on said rollers, said member being mounted on said frame, respectively, at a cable entrance and at a cable exit of said device for preventing said cable from becoming disengaged from said roller, means disposing said fastening point of said chassis and the contact points of the cable with said members, when seen in orthogonal projection on the common plane of said axes of said rollers, to form a substantially isosceles triangle having said fastening point at its vertex and a line between said contact points as its base, said vertex and said orthogonal projection on said plane of the part of the cable located between its said contact points being located on the same side of said base of said triangle whereby said chassis is positioned by its suspended connection to said fixed element to urge said members against said cable.

2. A supporting and guiding device for an aerial cable according to claim 1 having a rod connected to said chassis and disposed substantially normal to said cable, and a pair of fastening cables connected at their ends between said rod and said chassis, the connection of said fastening cables to said rod being adjustable relative to said chassis, and said fastening cable comprising said means for supporting said chassis from a point on the fixed element.

3. A supporting and guiding device for an aerial cable according to claim 2, wherein said chassis has a triangular shape defining a base and a vertex, and said rod passes through said vertex of said triangular chassis.

4. A supporting and guiding device for a longitudinally movable aerial cable comprising a chassis having a fastening point and having at least two rollers for supporting cable, said rollers being rotatably mounted on said chassis and having substantially parallel rotational axes, means connected to said fastening point for suspending said chassis from a fixed element, two members for limiting lateral movement of said cable on said rollers, said members being mounted on frame, respectively, at a cable entrance and at a cable exit of said device for preventing said cable form becoming disengaged form said rollers, means disposing said fastening point of said chassis and the contact points of the cable with said members, when seen in orthogonal projection on the common plane of said axes of said rollers, to form a substantially isosceles triangle.